UNITED STATES PATENT OFFICE.

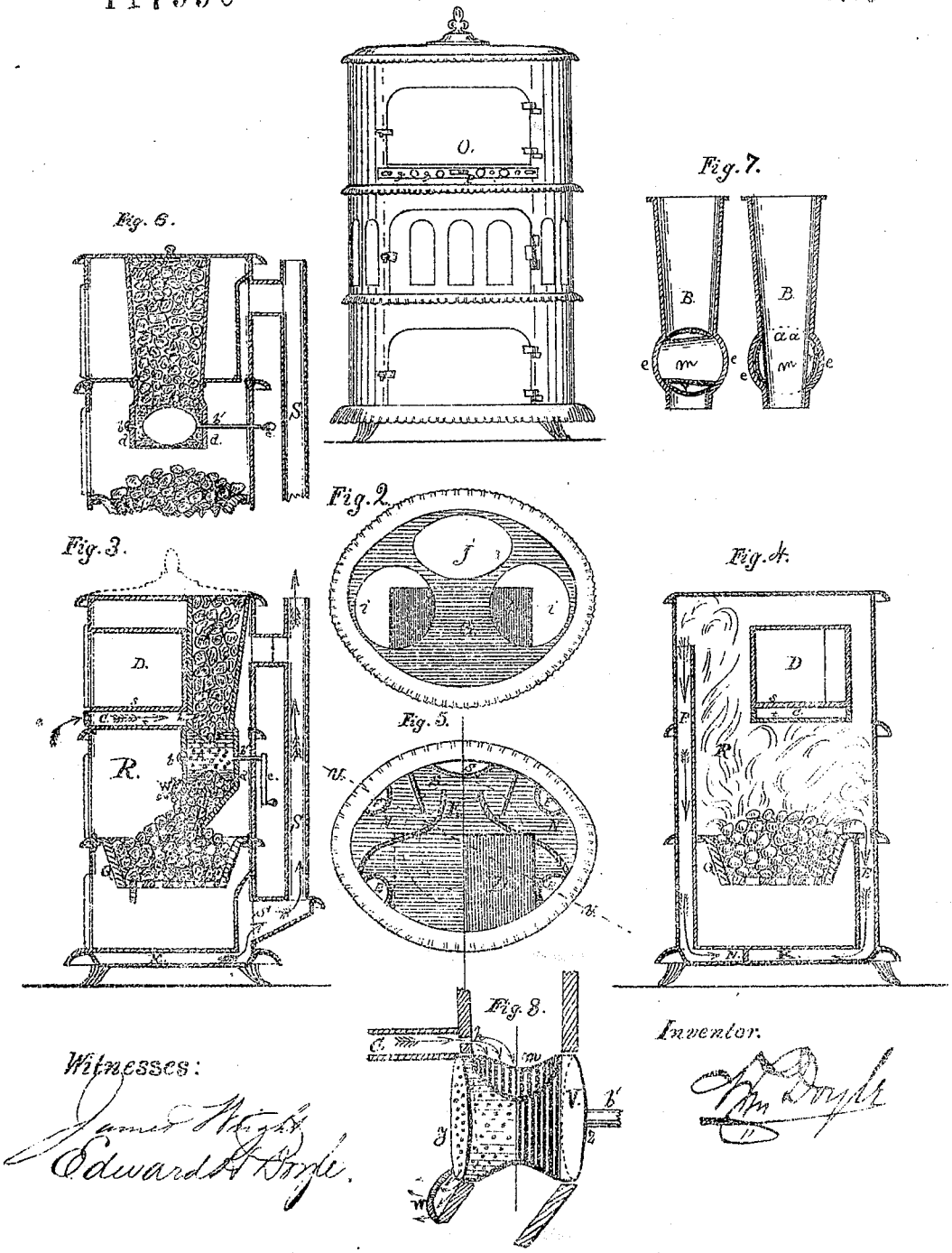

WILLIAM DOYLE, OF ALBANY, NEW YORK.

IMPROVEMENT IN BASE-BURNING STOVES.

Specification forming part of Letters Patent No. 117,996, dated August 15, 1871.

*To all whom it may concern:*

Be it known that I, WILLIAM DOYLE, of Albany, in the county of Albany and State of New York, have invented certain new and useful Improvements in Base-Burning Parlor Cooking-Stoves, of which the following is a specification:

The first part of my invention relates to the construction of a rotary valve near the bottom of the reservoir of a base-burning stove, arranged so as to be able to cut off the supply of fuel held in the reservoir, whenever necessary. The second part of my invention relates to the construction of an oven within the combustion-chamber of a base-burning stove, and combining therewith an air-chamber, which is also connected to the fuel-reservoir of the stove. The third part of my invention relates to the arrangement and combination of an oven within the combustion-chamber of a base-burning stove, with flues of a peculiar construction, and a top plate, by which boiling may be equally as well done as baking at the same time, and an extension flue, all of which will be fully hereinafter shown.

In the accompanying drawing, Figure 1 is a perspective view of a stove embodying my invention. Fig. 2 is a view of the top plate and oven of the stove. Fig. 3 is a central vertical section from front to rear of the stove. Fig. 4 is a central vertical section on the plane of a line, $v\ v$, in Fig. 5. Fig. 5 is a plan of the base-flues, oven, and upper bottom plate of the base of the stove. Fig. 6 is a sectional view of a stove having a reservoir in the center of the stove. Fig. 7 is a view of my improved reservoir, showing the bottom valve as open and shut. Fig. 8 is a perspective view of valve A.

A is a revolving valve, cylindrical in form, and perforated centrally and at right angles to its axis by a conical aperture corresponding to the place it occupies, near the bottom of the reservoir, so that, when in the position shown at $a\ a$ in Fig. 7, the conical aperture in said valve A will form a continuous fuel-passage of equal size with the reservoir, as therein shown. The two circular ends of valve A are fitted to revolve freely within recess $d$ at the bottom of the reservoir; or they may, if necessary, revolve on pivots $b\ b'$. One pivot, $b'$, is lengthened so as to form a shaft, and passes through and a little beyond the outer casing at the back of the stove, so that a crank, $c$, may be attached to it for the purpose of revolving valve A, when required, as shown in Figs. 3 and 6. It will be seen in Fig. 8 that valve A is a hollow cylinder having two ends to it, one of which, $y$, is perforated, and the other, $z$, has the shaft $b'$ attached to it; and, also, that the body of the cylinder is full of perforations, and that the frustum of a cone, $m$, which penetrates the cylinder is also perforated or grated. Between the conical frustum $m$ and cylinder A there is an air-space, V, shown in Figs. 7 and 8. As the air passes into chamber C it continues through aperture $h$ into reservoir B, and thence passes downward into conical frustum $m$; thence, through grated or other apertures, into chamber V, and down into gas-ring W, and out into the fire, as shown in Figs. 3 and 8. B is a fuel-reservoir, constructed with special reference to receiving-valve A, as shown at $d$ and $e$ in Figs. 3, 6, and 7. Reservoir B is placed near the back part of the stove, as shown in Fig. 3; but it may also be placed in the center of the stove, if so desired, as shown in Fig. 6. C is an air-chamber, formed between bottom oven-plate $s$ and fire-plate $t$, as shown in Figs. 3 and 4. Air-chamber C communicates with the outside air through apertures $f\ f$ in the register P below the oven-door O. Said apertures $f\ f$ are constantly open, without regard to the usual apertures $g\ g$ of the register P. D is an oven, constructed within the combustion-chamber of a base-burning stove. Below its bottom plate $s$ is another plate, $t$, between which is an air-space or chamber, C, communicating with the outside air through register P, and with the fuel-reservoir B by apertures $h$ at the back part of said air-chamber C. E E are two front flues. Commencing at the brim of the fire-pot Q, they pass downward to the double base of the stove, as shown in Figs. 4 and 5. F F are two back descending-flues. They differ from the front descending-flues E E by being carried upward within the combustion-chamber R nearly to the top plate G of the stove and the top of oven D, as shown in Figs. 4 and 5. In the base of the stove there are four flues—two side flues, N N, one extension flue, K, and one exit-flue, S.

The effect of the extension flue K is to produce an even draught through all the down flues of the stove. By extending the back descending-flues F F nearly to the top of the stove a great quantity of heat will pass upward to the top of the oven D, and, at the same time, near to top plate G, so as to facilitate both operations of baking and boiling, thus producing an excellent and useful parlor cooking-stove. The apertures $f\ f$ in register P admit air, which passes along the bottom of oven D between plates $s$ and $t$, and thence into reservoir B just above the rotary valve A, for the purpose of forming a current in reservoir B to carry down into the combustion-chamber any gas that may be in the reservoir. Should the bottom of oven D at any time become too hot it can be cooled by opening register P, so as to admit a greater quantity of cold air into chamber C.

The great utility of valve A will be recognized when we consider the great trouble and loss of time incurred whenever the fire is allowed to go out in a base-burning or fuel-reservoir stove, as it will frequently do, when but a small fire is needed, as in the early fall or late spring-time of the year. When the fire does go out and the reservoir is full of fuel, the grate cannot be dumped; then all the coal must be taken out of the stove before a good fire can be made. By using my improved reservoir and valve we escape all this trouble and annoyance, for we have only to rotate valve A to the position shown in Fig. 6, when all the fuel within the reservoir will be kept suspended above and entirely free from the grate until needed for further use.

Having fully described the construction and mode of operation of my invention, I will here state that what I wish to secure by Letters Patent is—

1. Revolving valve A, in combination with reservoir B of a base-burning stove or furnace, when constructed in the manner and for the purpose herein shown and set forth.

2. The combination and arrangement of oven D, air-chamber C, and reservoir B within the combustion-chamber of a base-burning stove, as herein set forth.

3. The oven D within the combustion-chamber of a base-burning stove, combined with and arranged with reference to top plate G, reservoir B, descending-flues E E and F F, and extension flue K, and air-chamber C, in the manner and for the purpose herein shown and set forth.

WM. DOYLE.

Witnesses:
 JAMES WRIGHT,
 E. H. DOYLE.